(12) United States Patent
Lamberts et al.

(10) Patent No.: US 11,644,986 B1
(45) Date of Patent: May 9, 2023

(54) ADAPTIVE POWER LOSS MANAGEMENT FOR DATA STORAGE DEVICES

(71) Applicant: Western Digital Technologies, Inc., San Jose, CA (US)

(72) Inventors: Bernd Lamberts, San Jose, CA (US); Shad H. Thorstenson, Rochester, MN (US); Andrew Larson, Rochester, MN (US); Mark Bergquist, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/531,734

(22) Filed: Nov. 20, 2021

(51) Int. Cl.
*G06F 12/00* (2006.01)
*G06F 3/06* (2006.01)
*G06F 12/0802* (2016.01)

(52) U.S. Cl.
CPC .......... *G06F 3/0625* (2013.01); *G06F 3/0655* (2013.01); *G06F 3/0679* (2013.01); *G06F 12/0802* (2013.01); *G06F 2212/60* (2013.01)

(58) Field of Classification Search
CPC .... G06F 3/0625; G06F 3/0655; G06F 3/0679; G06F 12/002; G06F 2212/60
See application file for complete search history.

(56) References Cited

U.S. PATENT DOCUMENTS

| | | | |
|---|---|---|---|
| 6,295,577 B1 | 9/2001 | Anderson et al. | |
| 9,047,932 B1* | 6/2015 | Nicholls | G11B 19/047 |
| 9,508,399 B1 | 11/2016 | Bottemiller et al. | |
| 9,933,955 B1 | 4/2018 | Gosla et al. | |
| 10,007,611 B2 | 6/2018 | Lamb | |
| 10,996,740 B2 | 5/2021 | Watanabe et al. | |
| 2002/0029354 A1 | 3/2002 | Forehand et al. | |
| 2005/0110444 A1* | 5/2005 | Hassan | G11B 19/00 |
| 2005/0117418 A1* | 6/2005 | Jewell | G06F 11/1441 |
| | | | 714/E11.138 |
| 2007/0076549 A1* | 4/2007 | Morishige | G11B 19/12 |
| | | | 369/47.39 |
| 2010/0229018 A1 | 9/2010 | Hutchison et al. | |
| 2012/0054520 A1 | 3/2012 | Ben-Tsion | |
| 2012/0303867 A1 | 11/2012 | Hall | |
| 2021/0123982 A1* | 4/2021 | Pantazis | H04W 52/0258 |

OTHER PUBLICATIONS

Radix, "NVDIMM for Write-Back Cache Protection", accessed Jul. 26, 2021, available at: https://www.raidix.com/products/about/nvdimm-support/.

* cited by examiner

*Primary Examiner* — Gurtej Bansal
(74) *Attorney, Agent, or Firm* — Barry IP Law, P.C.

(57) ABSTRACT

A Data Storage Device (DSD) includes at least one Non-Volatile Memory (NVM) configured to store data and a Non-Volatile Cache (NVC). Write data is stored in a volatile memory in preparation for writing the write data in the at least one NVM. In response to a power loss of the DSD, at least a portion of the data stored in the volatile memory is transferred from the volatile memory to the NVC and one or more parameters are determined for deriving a margin representing an additional amount of data for transfer from the volatile memory to the NVC using a remaining power following a power loss. A size of the NVC is adjusted based at least in part on the derived margin.

20 Claims, 4 Drawing Sheets

ADAPTIVE POWER LOSS MANAGEMENT FOR DATA STORAGE DEVICES

BACKGROUND

Data Storage Devices (DSDs) are often used to record data onto or to reproduce data from a Non-Volatile Memory (NVM) such as a rotating magnetic disk or a solid-state memory. In some cases, DSDs may cache data received from a host in a volatile memory before writing the data to the NVM. Deferring the writing of the data in the NVM can provide performance benefits by acknowledging the completion of the write command to the host quicker before the data is written in the NVM and/or by performing the write command when it is more efficient for the DSD, such as when using a Rotational Position Optimization (RPO) algorithm to reduce a seek distance across a disk surface. Other data, such as system metadata, may also be temporarily stored in the volatile memory.

When the DSD loses power, such as during an Emergency Power Off (EPO) where the power loss is unexpected, the data stored in the volatile memory needs to be quickly transferred to a Non-Volatile Cache (NVC) to prevent loss of the data. In the example of a Hard Disk Drive (HDD), a spindle motor used to rotate the disk may be used to provide power to facilitate the transfer of data from the volatile memory to the NVC. In the example of a Solid-State Drive (SSD), one or more hold-up capacitors may be used to provide power to facilitate the transfer of data from the volatile memory to the NVC. The size of the NVC, and by extension the amount of data that can be transferred from the volatile memory to the NVC for persistent storage, is typically limited to a worst-case scenario to ensure that the data to be kept after the power loss (i.e., power-safe data) can be transferred to the NVC. The overall amount of data being stored in volatile memory, however, has substantially increased in recent years to improve performance of DSDs and to accommodate additional system metadata resulting from larger storage capacities, such as indirection metadata mapping logical addresses to physical addresses of the NVM.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Data Storage Device Examples

Figure 1:
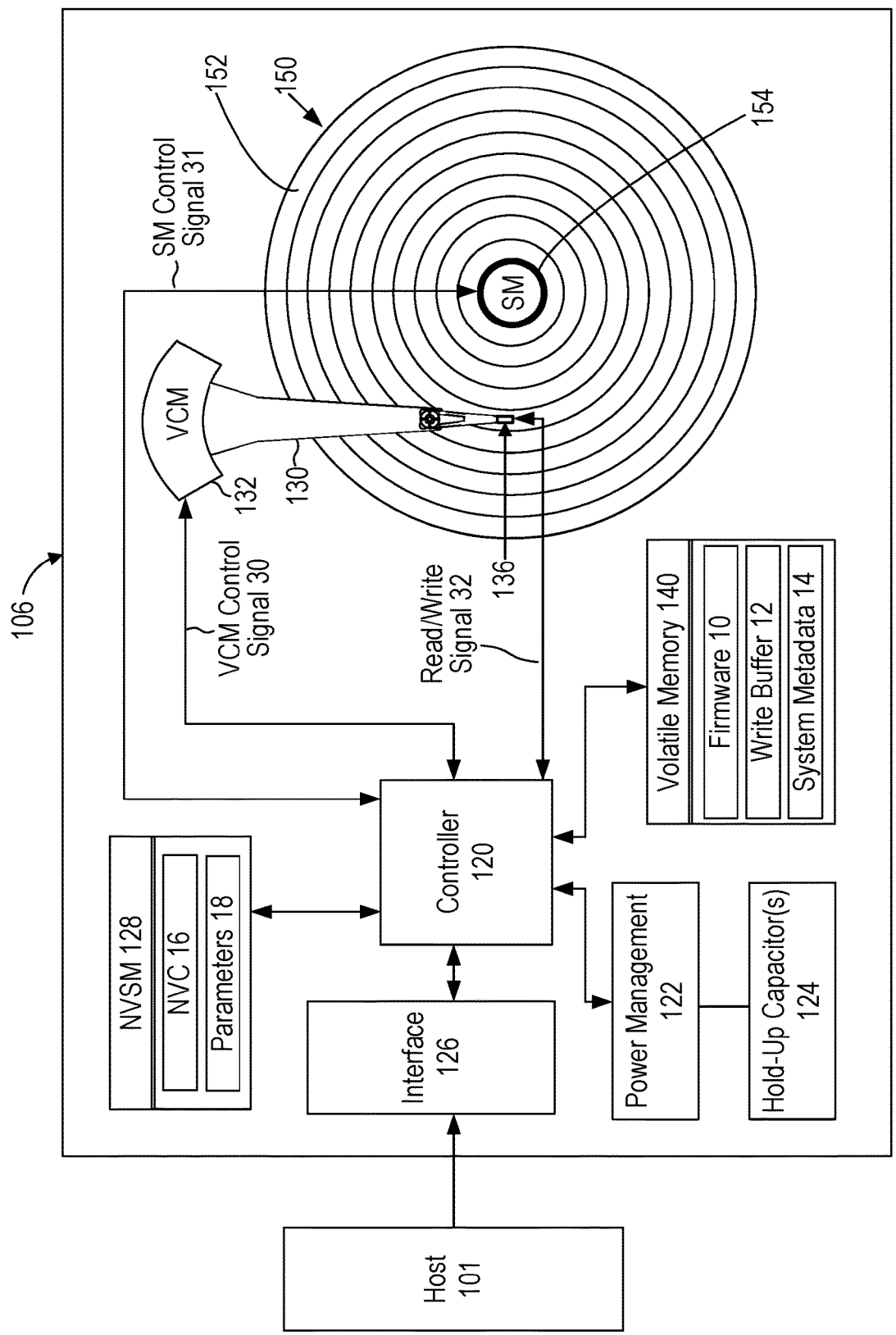
FIG. 1 is a block diagram of a Data Storage Device (DSD) including at least one rotating magnetic disk according to one or more embodiments.

FIG. 1 shows an example of Data Storage Device (DSD) 106, which receives data from host 101 according to one or more embodiments. As shown in the example of FIG. 1, DSD 106 includes Non-Volatile Memory (NVM) in the form of rotating magnetic disk 150 and Non-Volatile Solid-State Memory (NVSM) 128. In this regard, DSD 106 may be considered a Solid-State Hybrid Drive (SSHD) since it includes both solid-state and disk media, or may be considered a Hard Disk Drive (HDD) since it includes a rotating magnetic disk. In other embodiments, DSD 106 can include other NVM media such as magnetic tape. One or both of disk 150 and NVSM 128 can be omitted or replaced in other embodiments by a different NVM media, as in the example of DSD 206 in FIG. 2. In yet other embodiments, one or both of disk 150 or NVSM 128 can be replaced by multiple HDDs or multiple Solid-State Drives (SSDs), respectively, so that DSD 106 includes pools of HDDs and/or SSDs, which may be used, for example, as one or more logical drives.

In one example variation, NVSM 128 may be omitted so that the NVM of DSD 106 includes only disk storage media. In such an example, disk 150 can include a Non-Volatile Cache (NVC) as a group or zone of tracks 152 located near an Outer Diameter (OD) portion of disk 150. Such an NVC can serve as a Media Based Cache (MBC) on disk 150 that can be written and read quicker than other portions of disk 150 due to its location near the OD portion. Other portions of disk 150, such as the Inner Diameter (ID) portion have tracks with a shorter length due to being located closer to the center of disk 150. Since all portions of disk 150 rotate at the same speed, longer tracks near the OD portion allow for more data to be written and read in a given period of time.

In the example of FIG. 1, DSD 106 includes controller 120, which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In one implementation, controller 120 can include a System On a Chip (SoC), which may also include volatile memory 140 or other local memory.

Interface 126 is configured to interface DSD 106 with host 101, and may interface using, for example, Serial Advanced Technology Attachment (SATA), Peripheral Component Interconnect express (PCIe), Small Computer System Interface (SCSI), Serial Attached SCSI (SAS), Ethernet, or WiFi, and/or one or more other standards. As will be appreciated by those of ordinary skill in the art, interface 126 can be included as part of controller 120. Although FIG. 1 depicts the co-location of host 101 and DSD 106, in other implementations the two need not be physically co-located. In such implementations, DSD 106 may be located remotely from host 101 and connected to host 101 via a network interface.

In FIG. 1, disk 150 is rotated by spindle motor 154 and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks 152 on disk 150. A servo system (not shown) of controller 120 controls the rotation of disk 150 with SM control signal 31 and controls the position of head 136 using VCM control signal 30.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

DSD 106 also includes NVSM 128 for non-volatilely storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM), Programmable Metallization Cell RAM (PMC-RAM), Ovonic Unified Memory (OUM), Resistive RAM (RRAM), NAND memory (e.g., Single-Level Cell (SLC) memory, Multi-Level Cell (MLC) memory, Triple-Level Cell (TLC) memory, or any combination thereof), NOR memory, EEPROM, Ferroelectric Memory (FeRAM), Magnetoresistive RAM (MRAM), 3D XPoint memory, other discrete NVM (non-volatile memory) chips, or any combination thereof. In some implementations, NVSM can include a Storage Class Memory (SCM) that provides faster storage than disk 150 and may also provide for non-volatile storage using less energy than disk 150 in some cases.

As shown in FIG. 1, NVSM 128 includes NVC 16, which can be used to non-volatilely store data that is transferred from volatile memory 140 in the event of a power loss. In the example of FIG. 1, NVSM 128 also stores parameters 18, which are predetermined and/or determined by measuring, detecting, calculating, inferring, and/or collecting the parameters. As discussed in more detail below, parameters 18 can be used to derive a margin representing an additional amount of data beyond a baseline, initial, or current data size setting representing the amount of data that is transferred from volatile memory 140 to NVC 16 using a remaining power in DSD 106 following a power loss. In other implementations, parameters 18 may be stored in a different location, such as on disk 150, or may be stored in different locations, such as by storing some parameters in NVSM 128 and other parameters on disk 150.

Volatile memory 140, can include, for example, a Dynamic Random Access Memory (DRAM) or other type of volatile memory, such as Static Random Access Memory (SRAM). Data stored in volatile memory 140 can include data read from NVM such as disk 150 or NVSM 128, data to be stored in NVM, instructions loaded from firmware 10 for execution by controller 120, and/or data used in executing firmware 10.

Volatile memory 140 can also be used to temporarily store write data in write buffer 12 for write commands intended for disk 150. The write commands may come from a host, such as host 101, or may be part of a Read-Modify-Write (RMW) operation performed by DSD 106 to rewrite data on disk 150 (e.g., one or more sectors of data in a track 152 on disk 150). In this regard, data stored in write buffer 12 can include, for example, data used for maintenance operations on disk 150, such as garbage collection, or data that does not fit within an integral number of sectors on disk 150 (i.e., runt data) that is collected in write buffer 12 to form a full sector of data.

In some implementations, a mode of deferring write commands can be referred to as a Write Cache Enable (WCE) mode of performing write commands. In such a WCE example, DSD 106 may notify host 101 of the completion of a write command after the write command has been queued in volatile memory 140 or its write data stored in write buffer 12, but before the write command is actually performed on disk 150 or qualified as having been written on disk 150 by reading the data after it is written.

The deferral of write command performance can improve performance of DSD 106 in terms of the number of host commands that can be performed in a period of time (e.g., increased Input/Output Operations Per Second (IOPS)) and a reduced latency in performing the commands from the perspectives of both host 101 and DSD 106. In detail, more write commands or write data can be queued for performance, which increases IOPS and reduces latency from the perspective of host 101 to allow host 101 to send more commands to DSD 106. From the perspective of DSD 106, having more commands queued for performance on disk 150 can reduce the overall mechanical latency in performing the queued commands by using a Rotational Position Optimization (RPO) algorithm that rearranges the order for performing the commands to reduce the movement of head 136 over disk 150 in performing the commands.

In the example of FIG. 1, volatile memory 140 also stores system metadata 14, which can include, for example, indirection metadata that maps logical addresses to physical addresses in NVSM 128 and/or disk 150. Such indirection metadata may be used, for example, for maintenance operations of NVM, such as garbage collection, wear leveling, or defect mapping. In some implementations, indirection metadata may be used to facilitate Shingled Magnetic Recording (SMR) so that data can be sequentially written in overlapping tracks on disk 150.

As discussed in more detail below, at least a portion of the data stored in volatile memory 140 (i.e., power-safe data), such as write data stored in write buffer 12 and/or system metadata 14, is transferred to NVC 16 of NVSM 128 in the event of a power loss of DSD 106, such as an Emergency Power Off (EPO) where power is unexpectedly lost at DSD 106. The transfer of data to NVC 16 prevents loss of such power-safe data stored in volatile memory 140. The amount of write data stored in write buffer 12 and/or metadata stored as system metadata 14 may be limited or set based on an amount of power-safe data that can be transferred from volatile memory 140 to NVC 26 without losing the data following a power loss. In this regard, a safety value, such as a safety factor (e.g., 1.10) or additional safety margin (e.g., 5 Megabytes (MB)) may be used to ensure that all the data stored in write buffer 12, system metadata 14, and/or other power-safe data stored in volatile memory 140 can be transferred to NVC 16 under a variety of conditions.

In one implementation, kinetic energy from the rotation of SM 154 can be used to temporarily power NVSM 128 to facilitate the transfer of data from volatile memory 140 to NVC 16. In some implementations, use of write buffer 12 may be temporarily disabled when the rotation of disk 150 falls below a threshold rotational speed such as during a low speed or a low power mode of disk 150. In addition, one or more hold-up capacitors 124 may be used to supply power to DSD 106 for a period of time following a power loss that may also allow for the transfer of data from volatile memory 140 to NVC 16.

Power management 122 may detect a power loss and notify controller 120, which in turn can execute portions of firmware 10 to transfer data from volatile memory 140 to NVC 16. Power management 122 can include, for example, a Power Large Scale Integrated Circuit (PLSI) or other Power Management Integrated Circuit (PMIC).

Unlike conventional DSDs with power-safe buffers, the size of NVC 16 can be adjusted by DSD 106 in the field based on a margin representing an additional amount of data that could have been transferred from volatile memory 140 to NVC 16 following one or more previous power losses. In some implementations, the margin may be derived by controller 120 based at least in part on the amount of energy available in the DSD following one or more power losses and a rate of energy consumption for transferring data from volatile memory 140 to NVC 16.

Controller 120 can use parameters 18 to derive the margin, such as by calculating, predicting, or inferring the margin. In some implementations, controller 120 may derive the margin by weighting one or more parameters with weights determined by a Machine Learning (ML) algorithm. The parameters can be determined following one or more power losses or some of the parameters may be predetermined. In some implementations, power management 122 and/or controller 120 can determine one or more of the parameters by measuring, detecting, collecting, calculating, or inferring the parameters in response to a power loss.

The parameters used to derive the margin can affect the amount of remaining energy available in DSD 106 following a power loss and/or a rate of energy consumption for transferring data from volatile memory 140 to NVC 16. The amount of remaining energy and rate of energy consumption may vary during different operating conditions of DSD 106 (e.g., temperature), when performing different operations (e.g., full disk rotational speed versus low disk rotational speed), and/or over the operational lifetime of DSD 106 as components such as NVSM 128 and hold-up capacitor or capacitors 124 age. The present disclosure allows DSDs to adjust the size of its NVC, or the amount of power-safe data stored in a volatile memory, throughout the life of the DSD to allow for a larger NVC and write buffer than for a worst-case scenario set at the factory that typically assumes a much lower remaining energy and higher rate of energy consumption for transferring data from the volatile memory to the NVC.

The parameters that may be determined by DSD 106, such as by measuring, detecting, collecting, calculating, or inferring the parameters following a power loss can include, for example, at least one of a voltage or a current remaining after one or more power losses, a temperature of DSD 106, a characteristic of NVSM 128, such as a write voltage threshold that may increase as the NVSM ages, a characteristic of one or more hold-up capacitors 124, such as a discharge voltage or discharge current that may decrease as the capacitor or capacitors age, a power level being used by the DSD when power is lost, and a processing performance characteristic, such as a clock speed of circuitry of DSD 106.

Examples of other parameters that may be used to determine the margin can include predetermined parameters, such as at least one of a number of disks rotated by spindle motor 154, a material used for disk 150, a torque constant of spindle motor 154, a winding resistance of spindle motor 154, a reverse bias voltage set for spindle motor 154, and a Thermal Interface Material (TIM) used for at least a portion of circuitry of DSD 106, such as for controller 120, power management 122, NVSM 128, and/or hold-up capacitors 124. In this regard, TIM can reduce an internal temperature of DSD 106, which can slow the aging of components such as hold-up capacitors 124 and NVSM 128, and may also reduce the rate of energy consumption (i.e., power) for transferring data from volatile memory 140 to NVC 16.

Those of ordinary skill in the art will appreciate with reference to the present disclosure that other implementations may include a different number or arrangement of components than those shown in FIG. 1. For example, other implementations may include multiple hosts communicating with DSD 106 or may not include disk 150, as in the example of FIG. 2 discussed below.

Figure 2:
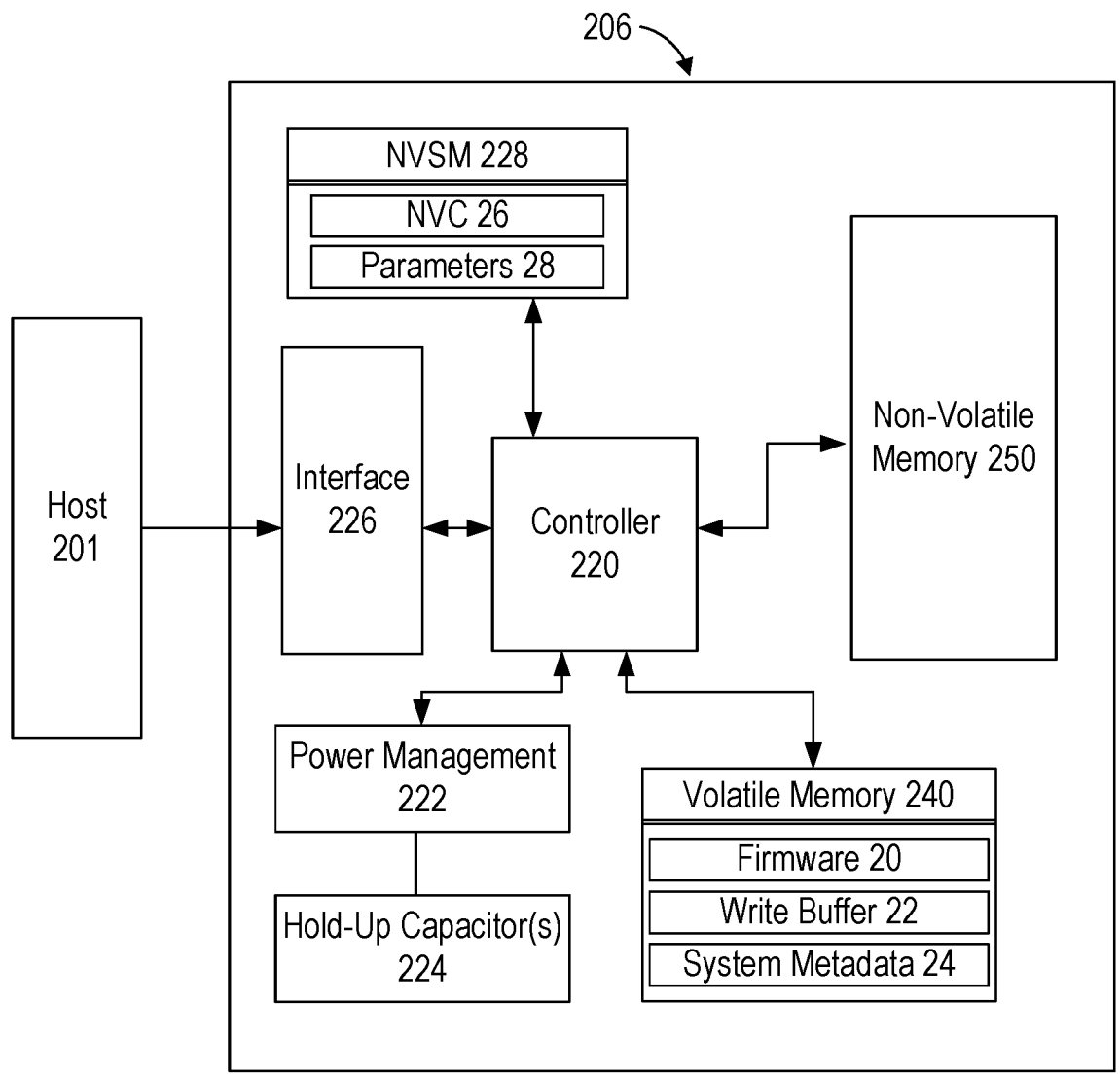
FIG. 2 is a block diagram of a DSD including a solid-state memory for non-volatile storage according to one or more embodiments.

FIG. 2 is a block diagram of DSD 206, which receives data from host 201 according to one or more embodiments. As shown in the example of FIG. 2, DSD 206 includes NVM 250 instead of disk 150 as in FIG. 1. In this regard, DSD 206 may be considered an SSD since it does not use a rotating magnetic disk for NVM.

In one example variation, NVSM 228 may be omitted so that the NVM of DSD 106 includes only NVM 250. In such an example, NVM 250 can store NVC 26 instead of NVSM 228.

DSD 206 includes controller 220, which includes circuitry such as one or more processors for executing instructions and can include a microcontroller, a DSP, an ASIC, an FPGA, hard-wired logic, analog circuitry and/or a combination thereof. In one implementation, controller 220 can include an SoC, which may also include volatile memory 240.

Interface 226 is configured to interface DSD 206 with host 201, and may interface using, for example, SATA, PCIe, SCSI, SAS, Ethernet, or WiFi, and/or one or more other standards. As will be appreciated by those of ordinary skill in the art, interface 226 can be included as part of controller 220. Although FIG. 2 depicts the co-location of host 201 and DSD 206, in other implementations the two need not be physically co-located. In such embodiments, DSD 206 may be located remotely from host 201 and connected to host 201 via a network interface.

DSD 206 also includes NVSM 228 for non-volatilely storing data. In some implementations, NVSM 228 can include an SCM that provides faster storage than NVM 250 and may also provide for storage using less energy than NVM 250 in some cases.

As shown in FIG. 2, NVSM 228 includes NVC 26, which can be used to non-volatilely store data that is transferred from volatile memory 240 in the event of a power loss. In the example of FIG. 2, NVSM 228 also stores parameters 28, which are predetermined and/or determined by measuring, detecting, calculating, inferring, and/or collecting the parameters to derive a margin representing an amount of data that could safely be transferred from volatile memory 240 to NVC 26 in addition to a current, initial, or baseline amount of power-safe data set for transfer to NVC 26 following a power loss. In other implementations, parameters 28 may be stored in a different location, such as in NVM 250, or may be stored in different locations, such as by storing some parameters in NVSM 228 and other parameters in NVM 250.

Volatile memory 240, can include, for example, a DRAM or other type of volatile memory, such as an SRAM. Data stored in volatile memory 240 can include data read from NVM such as NVM 250 or NVSM 228, data to be stored in NVM, instructions loaded from firmware 20 for execution by controller 220, and/or data used in executing firmware 20.

Volatile memory 240 can also be used to temporarily store write data in write buffer 22 for write commands intended for NVM 250. The write commands may come from a host, such as host 201, or may be part of a RMW operation performed by DSD 206 to rewrite data in NVM 250. As discussed above, using write buffer 22 to defer performing write commands in NVM can improve performance of DSD 206 in terms of the number of host commands that can be performed in a period of time (e.g., increased IOPS) and a reduced latency in performing the commands from the perspectives of both host 201 and DSD 206.

In the example of FIG. 2, volatile memory 240 also stores system metadata 24, which can include, for example, indirection metadata that maps logical addresses to physical addresses in NVSM 228 and/or NVM 250. Such indirection metadata may be used, for example, for maintenance operations of the NVM, such as garbage collection, wear leveling, or defect mapping.

At least a portion of the data stored in volatile memory 240, such as write data stored in write buffer 22, system metadata 14, and/or other power-safe data, is transferred to NVC 26 of NVSM 228 in the event of a power loss of DSD 206, such as an EPO where power is unexpectedly lost at DSD 206. The transfer of data to NVC 26 ordinarily prevents loss of such power-safe data stored in volatile memory 240. Write buffer 22, system metadata 24, and/or NVC 26 may be sized to ensure that all the power-safe data can be transferred to NVC 26 following a power loss.

In the example of DSD 206 in FIG. 2, one or more hold-up capacitors 224 may be used to supply power to DSD 206 following a power loss to facilitate the transfer of data from volatile memory 240 to NVC 26. Power management 222 may detect the power loss and notify controller 220, which executes portions of firmware 20 to quickly transfer data from volatile memory 240 to NVC 26. Power management 222 can include, for example, a PLSI or a PMIC.

Unlike conventional DSDs, the size of NVC 26 and therefore the amount of power-safe data can be adjusted by DSD 206 in the field based on a margin representing an additional amount of data that could have been transferred from volatile memory 240 to NVC 26 following one or more previous power losses. The margin may be derived by controller 220 based at least in part on the amount of energy available in the DSD following one or more power losses and a rate of energy consumption for transferring data from volatile memory 240 to NVC 26.

Controller 220 can use parameters 28 to derive the margin, such as by calculating or inferring the margin. In some implementations, controller 220 may derive the margin by weighting one or more parameters with weights determined by a ML algorithm. The parameters can be determined, such as by being measured, detected, collected, calculated, or inferred following one or more power losses or the parameters may be predetermined. In some implementations, power management 222 and/or controller 220 can determine one or more of the parameters following a power loss.

The parameters used to derive the margin affect the amount of remaining energy available in DSD 206 following a power loss and/or a rate of energy consumption for transferring data from volatile memory 240 to NVC 26. In this regard, the amount of remaining energy and rate of energy consumption may vary during different operating conditions of DSD 206, when performing different operations or workloads, and/or over the operational lifetime of DSD 206. The present disclosure allows DSDs to adjust the size of its NVC, or the amount of power-safe data stored in a volatile memory, throughout the life of the DSD to allow for a larger NVC and write buffer that can improve performance of the DSD beyond a worst-case scenario that assumes a much lower remaining energy and higher rate of energy consumption for transferring data from the volatile memory to the NVC.

The parameters that may be determined by DSD 206 following a power loss can include, for example, at least one of a voltage or current remaining after one or more power losses, a temperature of DSD 206, a characteristic of NVSM 228, such as a write voltage threshold that may increase as the NVSM ages or a storage capacity that may decrease as NVSM 228 deteriorates, a characteristic of one or more hold-up capacitors 224, such as a discharge voltage or current that may decrease as the capacitor or capacitors age, a power level being used by the DSD when power is lost, and a processing performance characteristic, such as a clock speed of circuitry of DSD 206. Examples of other parameters that may be used to determine the margin can include predetermined parameters, such as a TIM used for at least a portion of circuitry of DSD 206, such as for controller 120, which can reduce an internal temperature of DSD 206.

Those of ordinary skill in the art will appreciate with reference to the present disclosure that other implementations may include a different number or arrangement of components than those shown in FIG. 2. For example, other implementations may include multiple hosts communicating with DSD 206 or may include a different type of NVM, as in the example of DSD 106 in FIG. 1 discussed above.

Example Processes

Figure 3:
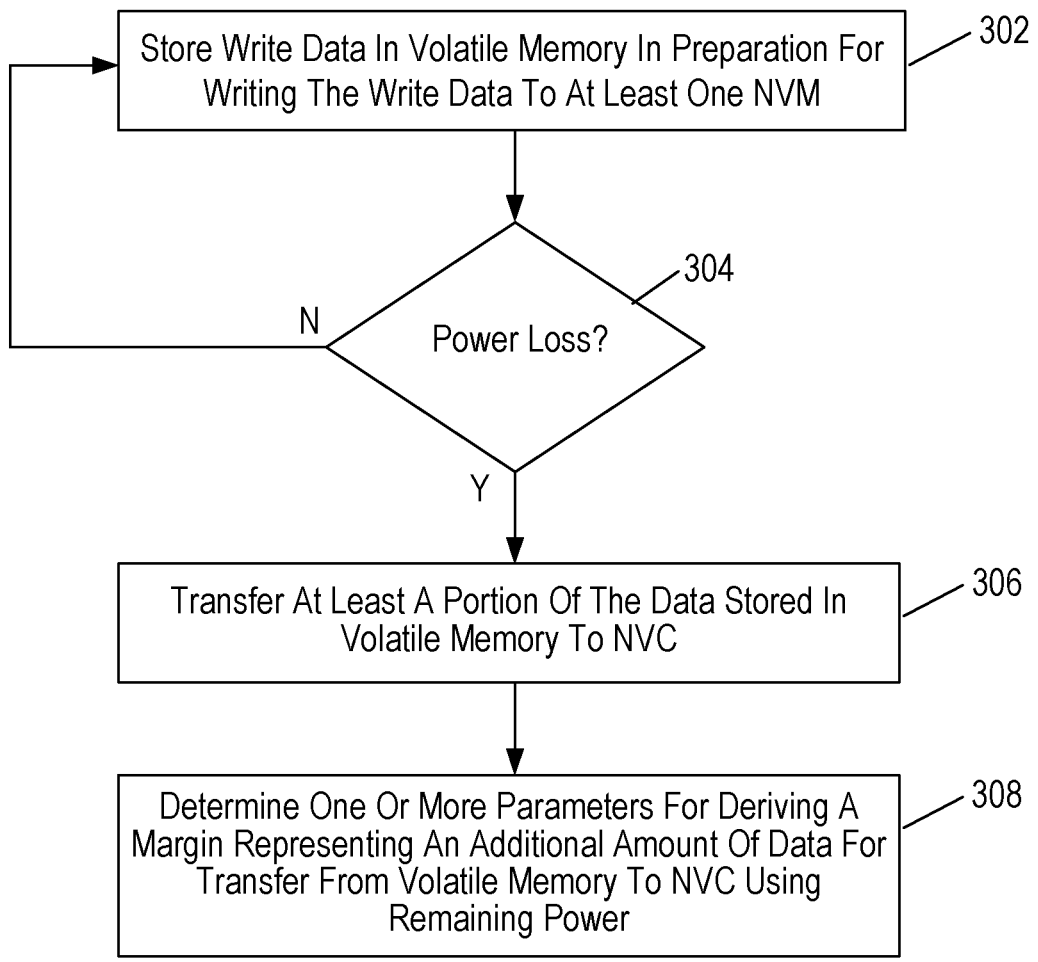
FIG. 3 is a flowchart of a power loss process according to one or more embodiments.

FIG. 3 is a flowchart of a power loss process according to one or more embodiments. The process of FIG. 3 can be performed by circuitry of a DSD, such as controller 120 and/or power management 122 in FIG. 1, or controller 220 and/or power management 222 in FIG. 2.

In block 302, write data is stored in a volatile memory of the DSD in preparation for writing the write data to at least one NVM of the DSD, such as a rotating magnetic disk or a non-volatile solid-state memory. The write data may include data from write commands received from a host. As discussed above with reference to FIGS. 1 and 2, the write data may be stored in a write buffer of the volatile memory to allow for acknowledging completion of write commands to the host before the write data is written to the NVM or qualified as having been written in the NVM. In addition, circuitry of the DSD may also store other data in the volatile memory during operation, such as system metadata, that may be protected in the event of a power loss by transferring such power-safe data from the volatile memory.

In block 304, a power loss is detected by circuitry of the DSD. As discussed above, a power management portion of the circuitry may detect the power loss by monitoring a power supplied to the DSD. In some implementations, the triggering power loss may only be when power is unexpectedly lost, such as during an EPO. In other implementations, the triggering power loss in block 304 may include both unexpected power losses and expected power losses, such as part of a shutdown procedure for the DSD.

If no power loss is detected in block 304, the process remains at block 302 to continue to store write data in the volatile memory. On the other hand, if a power loss is detected in block 304, the circuitry in block 306 transfers at least a portion of the data stored in the volatile memory (i.e., power-safe data) to an NVC in response to the power loss. The data transferred to the NVC can include data that has been designated as power-safe, such as write data that has not been qualified as written in the NVM and/or system metadata (e.g., indirection metadata).

In block 308, the circuitry determines one or more parameters for deriving a margin representing an additional amount of data for transfer from the volatile memory to the NVC in response to the power loss. The parameters determined by the circuitry can include, for example, at least one of a voltage or a current remaining after the power loss, a temperature of the DSD, a characteristic of the media used to store the NVC, a characteristic of one or more hold-up capacitors used to maintain power, a power level being used by the DSD when power is lost, and a processing performance characteristic of the DSD. The circuitry may measure, detect, calculate, infer, and/or collect such parameters using the remaining power following the power loss and store them in an NVM, such as with parameters 18 in FIG. 1 or parameters 28 in FIG. 2.

The parameters may be determined over a number of power losses, such as by calculating an average value of remaining voltages or currents following each power loss. In some cases, parameters may be determined for both expected power losses (e.g., system shutdown) and unexpected power losses (e.g., EPOs). The determined parameters may also be stored or collected with other predetermined parameters used to derive a margin, such as at least one of a number of disks rotated by a spindle motor of the DSD, a material used for such disks, a torque constant of the spindle motor, a winding resistance of the spindle motor, a reverse bias voltage set for the spindle motor, and a TIM used for at least a portion of the DSD.

Those of ordinary skill in the art will appreciate with reference to the present disclosure that the order of blocks for the power loss process of FIG. 3 may differ in other implementations. For example, the determination of one or more parameters in block 308 may precede the transfer of data from the volatile memory to the NVC in block 306.

Figure 4:
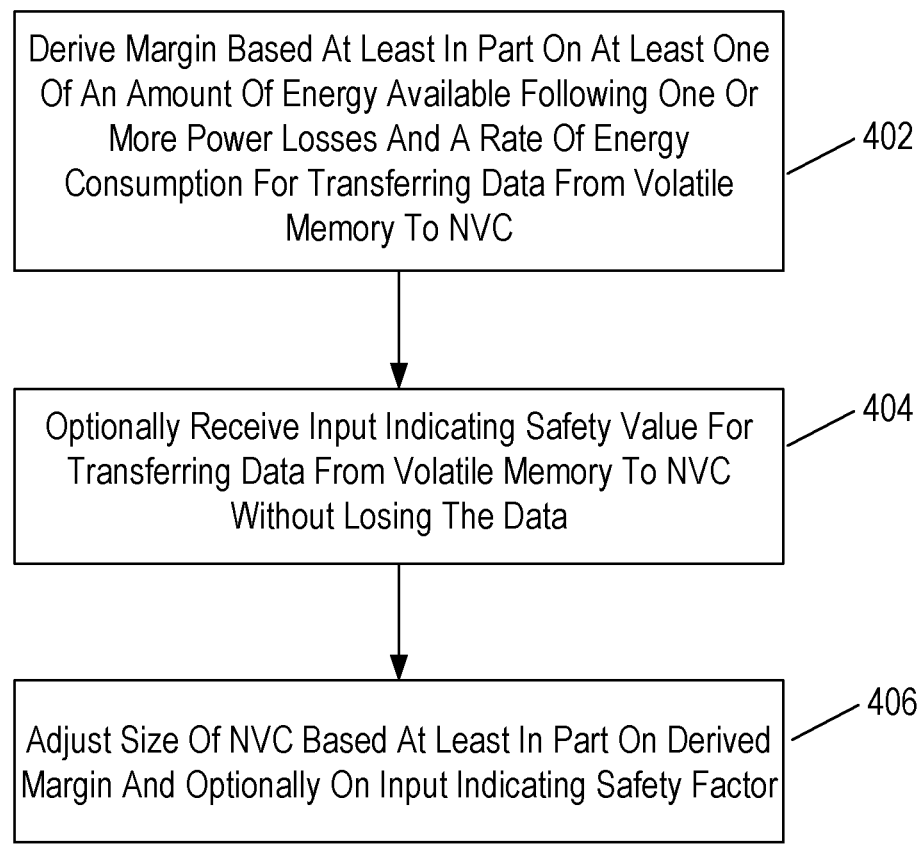
FIG. 4 is a flowchart for a Non-Volatile Cache (NVC) size adjustment process according to one or more embodiments.

FIG. 4 is a flowchart for a NVC size adjustment process according to one or more embodiments. The process of FIG. 4 can be performed by circuitry of a DSD, such as controller 120 in FIG. 1 or controller 220 in FIG. 2. In other implementations, the process of FIG. 4 can be performed by a host, such as host 101 or host 201 in FIG. 1 or 2, respectively.

In block 402, a margin is derived based at least in part on at least one of an amount of energy available following one or more power losses and a rate of energy consumption for transferring data from a volatile memory of a DSD to a NVC. The margin can represent an additional amount of data that can be safely transferred to the NVC in addition to a baseline, initial, or current data size setting representing the amount of power-safe data transferred from volatile memory to the NVC.

For example, the DSD may come with a preset or default NVC size, such as 280 Megabytes (MB), which may include 128 MB for a write buffer and 100 MB for system metadata. After a predetermined number of power cycles (e.g., 50 power cycles), an elapsed time period, and/or an amount of data stored in the DSD, the cache adjustment process of FIG. 4 may execute to predict or calculate a margin above the default NVC size based at least in part on parameters determined following one or more power losses or power cycles. In some implementations, the margin can be derived by weighting parameters with weights determined by a ML algorithm. The weights for the ML algorithm may, for example, be predetermined by the manufacturer and included as part of the firmware for the DSD.

In block 404, an input indicating a safety value is optionally received, such as from a host. The safety value can indicate a factor or additional margin for ensuring that the data transferred from the volatile memory can be successfully transferred. For example, a user preference may be to increase the margin for high reliability applications. The safety value may then be set higher to provide for a greater margin. In contrast, the user preference may be to prioritize performance over reliability so that the safety value lowers the margin for a more forgiving environment or for applications with a lower cost of failure.

In block 406, a current setting for the size of the NVC is adjusted based at least in part on the derived margin and optionally based on the input indicating the safety value. In some implementations, the current or default NVC size determined based on the margin derived in block 402 may first be tested, simulated, or compared to a new larger NVC size in block 406 over one or more additional power losses by determining if there would have been enough remaining energy to store the additional data represented by the derived margin.

If the larger NVC size using the derived margin could have successfully non-volatilely stored the additional data, the current NVC size, and by extension, the data designated as power-safe in the volatile memory (e.g., a write buffer and/or system metadata) is increased based on the derived margin and optionally based on the safety value of block 404. If the larger NVC size using the derived margin would not have successfully non-volatilely stored the additional data or would not have satisfied a safety value (e.g., a safety factor) either provided by the firmware of the DSD or received in block 404, the size of the NVC can remain the current setting size. In some implementations, an intermediate size can be set in block 406 that is less than the larger NVC size but greater than the current NVC size based at least in part on the derived margin and optionally based on the input indicating the safety value.

In some implementations, the sizes of the write buffer and system metadata may have a fixed ratio with respect to each other that is maintained when the overall NVC size is increased or decreased. In other implementations, the system metadata may remain fixed and only the write buffer size may be increased or decreased.

In some implementations, multiple NVC sizes may be tested, compared, or simulated over one or more power losses before adjusting the NVC size in block 406. As the DSD ages, the NVC size adjustment process of FIG. 4 may be repeated and can result in a decrease in the NVC size due to a smaller derived margin than a current margin.

Those of ordinary skill in the art will appreciate with reference to the present disclosure that the order of blocks for the NVC size adjustment process of FIG. 4 may differ in other implementations. For example, the receiving of a safety value in block 404 may be omitted in FIG. 4 or may occur before block 402 or after block 406.

As discussed above, the adjustment of a NVC size based on parameters determined in the field can ordinarily provide a larger NVC size resulting in improved performance (e.g., larger write buffer size). In addition, the foregoing NVC size adjustment can allow for particular workloads, operating conditions (e.g., temperature), and characteristics of the components of the DSD (e.g., rates of aging) to be taken into consideration to better tailor or individualize the NVC size to the DSD and its operating conditions.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
   at least one disk configured to store data;
   at least one head configured to write data on the at least one disk;
   a spindle motor configured to rotate the at least one disk;
   a Non-Volatile Cache (NVC);
   a volatile memory configured to temporarily store data; and
   circuitry configured to:
      store write data in the volatile memory in preparation for writing the write data on the at least one disk;
      control the at least one head to write the write data from the volatile memory onto the at least one disk;
      in response to a power loss of the DSD:
         transfer at least a portion of the data stored in the volatile memory to the NVC; and
         determine, using a remaining power following the power loss and before power is restored to the DSD, one or more parameters for deriving a margin representing an additional amount of data for transfer from the volatile memory to the NVC; and
      adjust a size of the NVC based at least in part on the derived margin.

2. The DSD of claim 1, wherein the circuitry is further configured to derive the margin based at least in part on at least one of an amount of energy available in the DSD following one or more power losses and a rate of energy consumption for transferring data from the volatile memory to the NVC.

3. The DSD of claim 1, wherein the one or more determined parameters include at least one of a voltage remaining following one or more power losses, a current remaining following one or more power losses, a temperature of the DSD, a characteristic of a storage medium used for the NVC, a characteristic of one or more hold-up capacitors of the DSD, a power level being used by the DSD when power is lost, and a processing performance characteristic of the DSD.

4. The DSD of claim 1, wherein the circuitry is further configured to derive the margin based at least in part on one or more predetermined parameters including at least one of a number of disks rotated by the spindle motor, a material used in the at least one disk, a torque constant of the spindle motor, a winding resistance of the spindle motor, a reverse bias voltage set for the spindle motor, and a Thermal Interface Material (TIM) used for at least a portion of the circuitry.

5. The DSD of claim 1, wherein the circuitry is further configured to derive the margin by weighting the one or more parameters with weights determined by a Machine Learning (ML) algorithm.

6. The DSD of claim 1, wherein the circuitry is further configured to derive the margin using parameters determined from a plurality of power losses.

7. The DSD of claim 1, wherein the circuitry is further configured to adjust the size of the NVC based at least in part on an input from a host indicating a safety value for transferring data from the volatile memory to the NVC without losing the data.

8. A method for determining a size of a Non-Volatile Cache (NVC) of a Data Storage Device (DSD), the method comprising:
   storing write data in a volatile memory of the DSD in preparation for writing the write data to at least one Non-Volatile Memory (NVM) of the DSD;
   in response to a power loss of the DSD:
      transferring at least a portion of the data stored in the volatile memory from the volatile memory to the NVC; and
      determining, using a remaining power following the power loss and before power is restored to the DSD, one or more parameters for deriving a margin representing an additional amount of data for transfer from the volatile memory to the NVC; and adjusting a size of the NVC based at least in part on the derived margin.

9. The method of claim 8, further comprising deriving the margin based at least in part on at least one of an amount of energy available in the DSD following one or more power losses and a rate of energy consumption for transferring data from the volatile memory to the NVC.

10. The method of claim 8, wherein the one or more determined parameters include at least one of a voltage remaining after one or more power losses, a current remaining after one or more power losses, a temperature of the DSD, a characteristic of a storage medium used for the NVC, a characteristic of one or more hold-up capacitors of the DSD, a power level being used by the DSD when power is lost, and a processing performance characteristic of the DSD.

11. The method of claim 8, further comprising deriving the margin based at least in part on one or more predetermined parameters including at least one of a number of disks rotated by a spindle motor of the DSD, a material used in at least one disk of the DSD, a torque constant of the spindle motor, a winding resistance of the spindle motor, a reverse bias voltage set for the spindle motor, and a Thermal Interface Material (TIM) used for at least a portion of the DSD.

12. The method of claim 8, further comprising deriving the margin by weighting the one or more parameters with one or more weights determined by a Machine Learning (ML) algorithm.

13. The method of claim 8, further comprising deriving the margin using parameters determined from a plurality of power losses.

14. The method of claim 8, further comprising adjusting the size of the NVC based at least in part on an input indicating a safety value for transferring data from the volatile memory to the NVC without losing the data.

15. A Data Storage Device (DSD), comprising:
at least one Non-Volatile Memory (NVM) configured to store data;
a Non-Volatile Cache (NVC);
a volatile memory configured to temporarily store data; and
means for:
in response to a power loss of the DSD:
transferring at least a portion of data stored in the volatile memory from the volatile memory to the NVC; and
determining, using a remaining power following the power loss and before power is restored to the DSD, one or more parameters for deriving a margin representing an additional amount of data for transfer from the volatile memory to the NVC; and
adjusting a size of the NVC based at least in part on the derived margin.

16. The DSD of claim 15, wherein the at least one NVM includes a solid-state memory and the remaining power following a power loss is provided by one or more hold-up capacitors.

17. The DSD of claim 15, wherein the at least one NVM includes a magnetic disk and the remaining power following a power loss is provided by a back Electro-Motive-Force (EMF) supplied by a motor configured to rotate the magnetic disk.

18. The DSD of claim 15, further comprising means for deriving the margin based at least in part on at least one of an amount of energy available in the DSD following one or more power losses and a rate of energy consumption for transferring data from the volatile memory to the NVC.

19. The DSD of claim 15, wherein the one or more determined parameters include at least one of a voltage remaining after one or more power losses, a current remaining after one or more power losses, a temperature of the DSD, a characteristic of a storage medium used for the NVC, a characteristic of one or more hold-up capacitors of the DSD, a power level being used by the DSD when power is lost, and a processing performance characteristic of the DSD.

20. The DSD of claim 15, further comprising means for deriving the margin using parameters determined from a plurality of power losses.

* * * * *